(12) United States Patent
Mayne

(10) Patent No.: US 8,864,857 B1
(45) Date of Patent: Oct. 21, 2014

(54) SELF REGULATING HYDROGEN GENERATOR

(76) Inventor: Harlo Mayne, Ironshore (JM)

( * ) Notice: Subject to any disclaimer, the term of this patent is extended or adjusted under 35 U.S.C. 154(b) by 716 days.

(21) Appl. No.: 13/191,089

(22) Filed: Jul. 26, 2011

Related U.S. Application Data

(60) Provisional application No. 61/516,643, filed on Apr. 6, 2011.

(51) Int. Cl.
*B01J 7/00* (2006.01)
*B01J 8/00* (2006.01)

(52) U.S. Cl.
USPC ............. 48/61; 48/127.9; 48/127.1; 423/294; 423/295; 423/650; 423/651; 423/652; 423/653; 423/654; 423/655; 423/656; 423/657; 423/658

(58) Field of Classification Search
USPC ................ 48/61, 127.1, 127.9; 423/650–658, 423/658.2
See application file for complete search history.

(56) References Cited

U.S. PATENT DOCUMENTS

| | | | |
|---|---|---|---|
| 3,374,052 A * | 3/1968 | Fan et al. | 423/653 |
| 7,648,540 B2 * | 1/2010 | Ramakrishna | 48/61 |

* cited by examiner

*Primary Examiner* — Kaity V. Handal
(74) *Attorney, Agent, or Firm* — Michael I. Kroll

(57) ABSTRACT

An apparatus for generating hydrogen gas from a replaceable aluminum pack comprising an aluminum and hydride mixture encased in a breathable membrane that is raised and lowered into a fluid contained within an enclosed tank wherein contact with the fluid releases hydrogen gas from the aluminum. A pressure transducer and microprocessor chip are provided for monitoring and regulating the rate of hydrogen production by engaging and disengaging a reversible motor that raises and lowers an inner tray on which the aluminum pack resides accordingly.

19 Claims, 11 Drawing Sheets

SELF REGULATING HYDROGEN GENERATOR

RELATED APPLICATIONS

This application is subject to U.S. provisional application Ser. No. 61/516,643 filed 19 Apr. 2011.

Please incorporate by reference all information in said provisional applications into this instant invention.

BACKGROUND OF THE INVENTION

1. Field of the Invention

Hydrogen is a "clean fuel" that can come from renewable sources such as water, aluminum, wind power, and many other sources. Hydrogen can be consumed by combustion engine with no harmful effect to the environment, as the only by-product is clean water.

The present invention relates generally to a process of making and controlling hydrogen gas on demand from aluminum, hydride, and water.

2. Description of the Prior Art

Numerous hydrogen gas making devices have been provided in prior art that are adapted to convert water and aluminum into gas through the use of electrolysis. While these units may be suitable for the particular purpose for which they address, they would not be suitable for the purposes of the present invention as heretofore described.

Several methods of storing hydrogen currently exist but are either inadequate or impractical for widespread consumer applications. For example, hydrogen can be stored in liquid form at very low temperatures. Cryogenic storage, however, only provides a low volume density per liter, which is insufficient for most consumer applications.

An alternative is to store hydrogen under high pressure in cylinders. However, a 100-pound steel cylinder can only store a few pounds of hydrogen at about 2200 psi at best, and at high cost.

Other methods of hydrogen storage include the use of metal compound to adsorb and release the hydrogen. However, these methods and compounds are expensive in large volumes and will be too heavy for some applications.

SUMMARY OF THE INVENTION

A primary object of the present invention is to provide a hydrogen generator that will overcome the shortcomings of the prior art devices.

Another object is to provide a hydrogen generator that that will produce hydrogen without the need of electrolysis.

A further object is to provide a hydrogen generator that combines aluminum, hydride and water in one unit for simplicity.

A still further object is to provide an $H^2yGen$ hydrogen generator that uses an oval shape container and inner tray to separate or extract aluminum from water and hydride, which controls the gas.

Still another object of the present invention is to provide a hydrogen generator apparatus which comprises a component for making gas and a component for controlling the gas.

Another object of the present invention is to provide a hydrogen generator wherein aluminum powder and hydride is placed in a package that is made of membrane.

Yet another object of the present invention is to provide a hydrogen generator container apparatus that is provided with a cover having a LCD display and buttons to control the gas; and is secured to the container by four quick-release clamps. A safety relief valve is embedded in the cover as added safety.

Still another object of the present invention is to provide a hydrogen generator wherein the container apparatus holds water and the cover has a DC motor embedded in a sealed compartment, which is attached to a screw rod. The screw rod is screwed to a threaded bore in the center of an inner tray to raise and lower the inner tray within the container apparatus.

Another object of the present invention is to provide a hydrogen generator having a sensor in communication with a microprocessor chip to raise and lower the inner tray accordingly to maintain substantially constant pressure within the container apparatus by regulating the exposure of the aluminum pack to the water.

It is an object of the present invention to provide a compact, safe and efficient system for generating hydrogen on demand. These and other objects of the invention will become more apparent from the detailed description and examples that follow.

A still further object is to provide a hydrogen generator that can be upgraded, serviced, maintained, and cleaned easily.

Further objects of the invention will appear as the description proceeds.

The present invention overcomes the shortcomings of the prior art by providing an apparatus for generating hydrogen gas from a replaceable aluminum pack comprising an aluminum and hydride mixture encased in a breathable membrane that is raised and lowered into a fluid contained within an enclosed tank wherein contact with the fluid releases hydrogen gas from the aluminum. A pressure transducer and microprocessor chip are provided for monitoring and regulating the rate of hydrogen production by engaging and disengaging a reversible motor that raises and lowers an inner tray on which the aluminum pack resides accordingly.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

Figure 1:
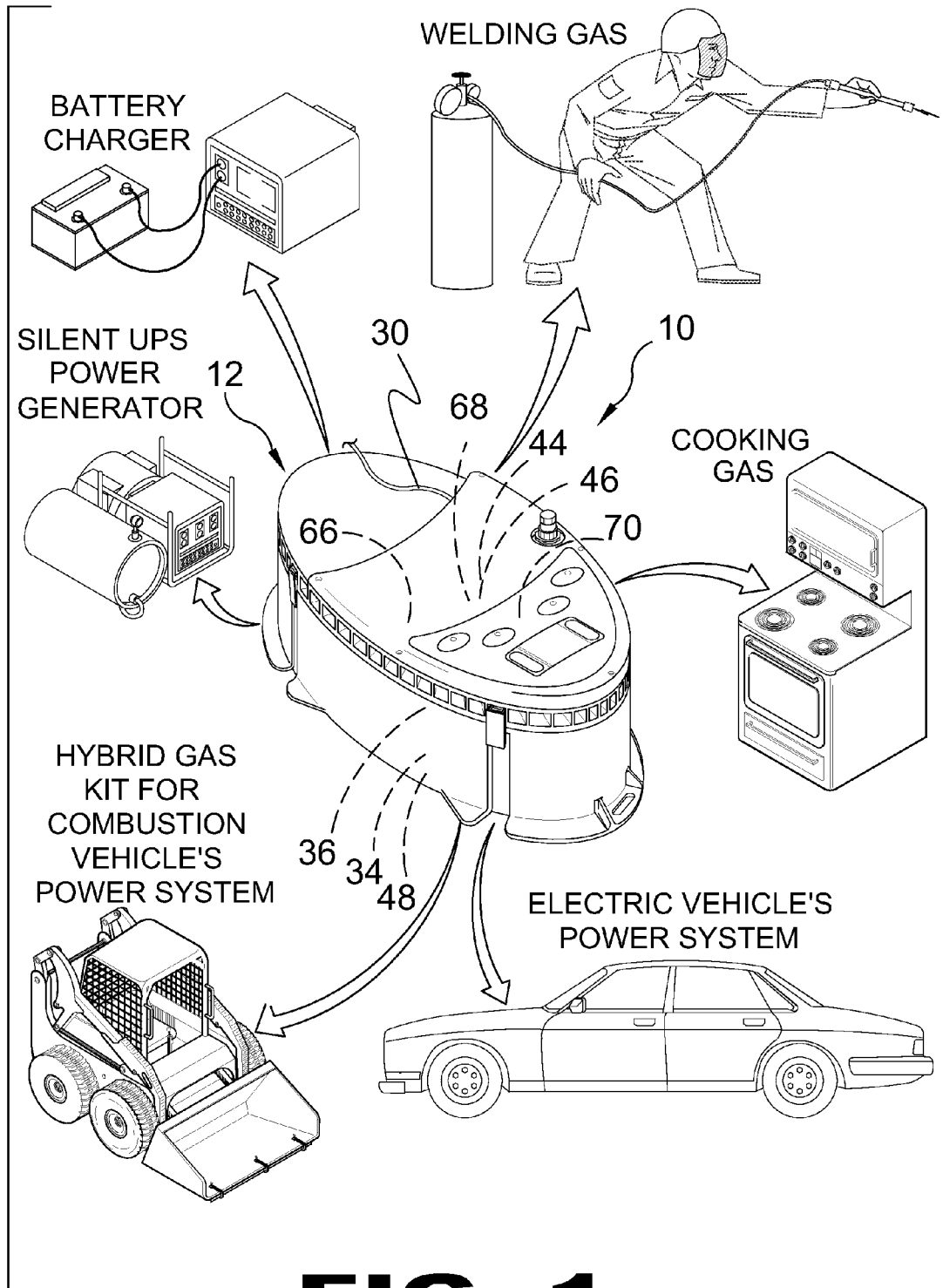
FIG. 1 is an illustrated view of the present invention in use.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DESCRIPTION OF THE REFERENCED NUMERALS

Turning now descriptively to the drawings, in which similar reference characters denote similar elements throughout the several views, the figures illustrate the Hydrogen Generator of the present invention. With regard to the reference numerals used, the following numbering is used throughout the various drawing figures.

| 10 | Hydrogen Generator of the present invention |
|---|---|
| 12 | container apparatus |
| 20 | housing of 12 |
| 22 | cover for 20 |
| 24 | clamp member |
| 26 | control button |
| 28 | digital display |
| 30 | hydrogen delivery hose |
| 32 | safety release valve |
| 34 | inner tray |
| 36 | aluminum pack |
| 38 | aluminum |
| 40 | hydride |
| 42 | membrane |
| 44 | motor |
| 46 | screw rod |
| 48 | water |
| 50 | motor gear |
| 52 | threaded bore of 34 |
| 54 | electrical wires |
| 56 | tank |
| 58 | hydrogen gas |
| 60 | LCD display cover |
| 62 | LCD display plate cover |
| 64 | fastener element |
| 66 | NiMH battery |
| 68 | pressure transducer |
| 70 | microprocessor chip |
| 72 | snap-on cover of 36 |
| 74 | silicone edge of 72 |
| 76 | hydrogen inlet valve |
| 78 | water outlet valve |

DETAILED DESCRIPTION THE PREFERRED EMBODIMENTS

FIG. 1 is an illustrated view of the present invention in use. Shown is the present invention being a hydrogen generator and process of making and controlling hydrogen gas on demand from aluminum, hydride and water. Hydrogen is a clean fuel that can come from renewable sources such as water, aluminum, wind power and other sources. Hydrogen can be consumed by combustion engines with no harmful effect to the environment, as the only by-product is clean water. Illustrated is the self generating hydrogen generator 10 comprising container apparatus 12 having NiMH battery 66 powering motor 44 driving screw rod 46 for raising and lowering tray 34 having aluminum hydride pack 36 thereon into water reservoir 48 thereby generating hydrogen gas with pressure transducer 68 in electrical communication with microprocessor 70 controlling the amount of gas generated by raising and lowering tray 34, which can then be fed by tube 30 into a plurality of illustrated devices.

Figure 2:
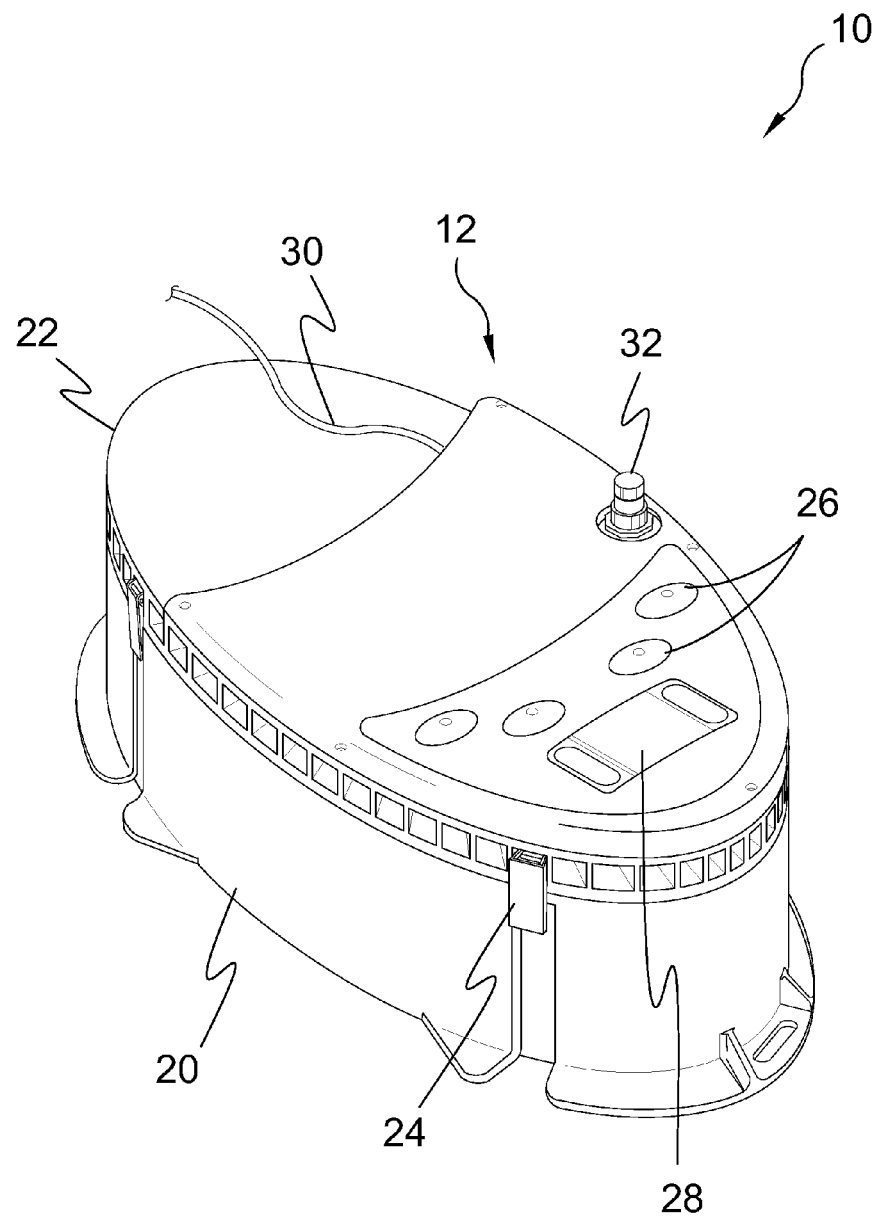
FIG. 2 is a perspective view of the present invention.

FIG. 2 is a perspective view of the present invention in a completely closed and assembled position. Shown is the container apparatus 12 having a housing 20 with a cover 22 secured thereto with a plurality of clamps 24. A plurality of control buttons 26 and digital display 28 is provided to enable the user to manually set the rate of hydrogen generation according to the usage and needs of the application. A hose 30 is provided to deliver the generated hydrogen to the application. The cover 22 further comprises a safety release valve 32 to relieve the internal pressure when approaching an overload condition.

Figure 3:
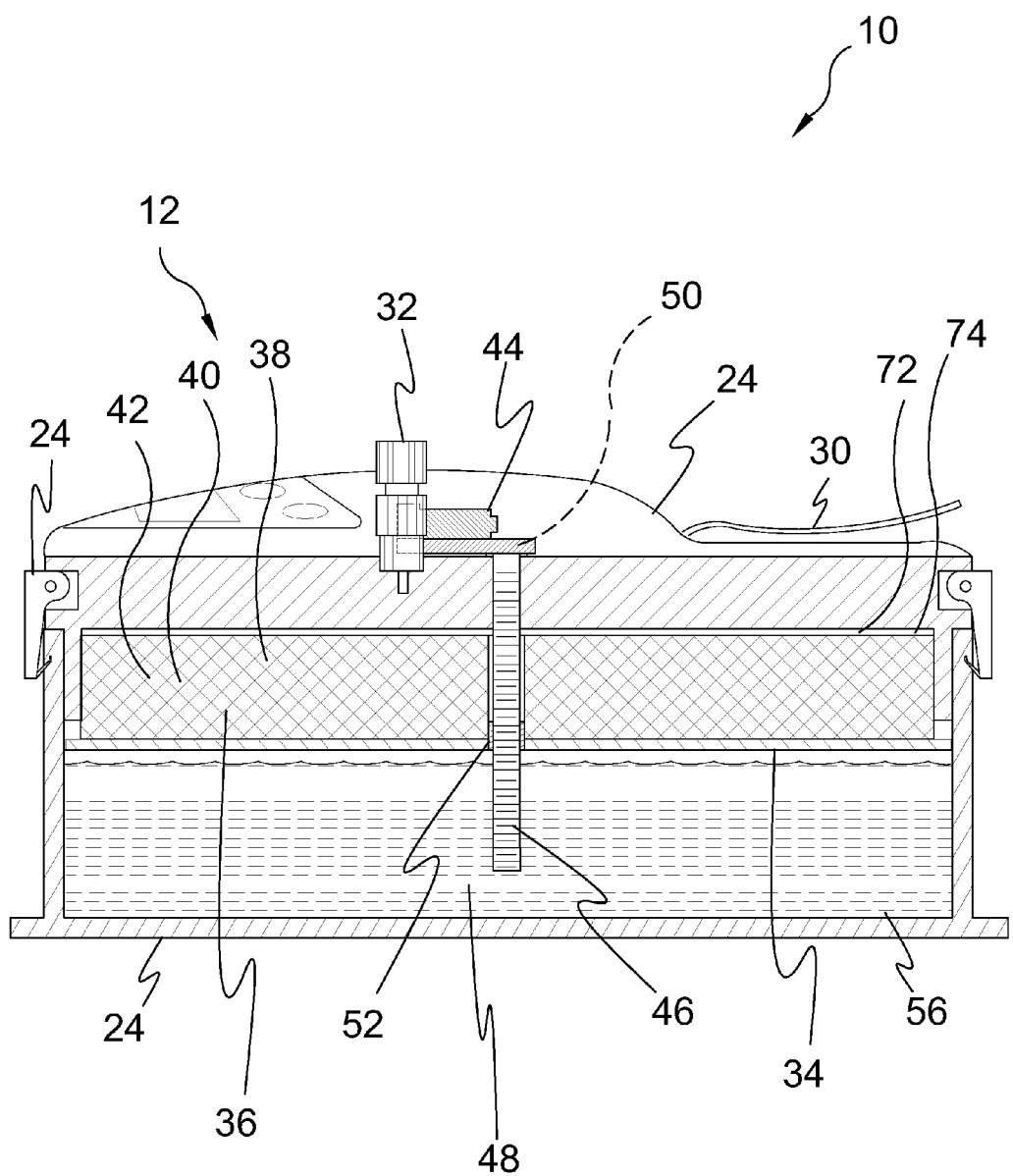
FIG. 3 is a sectional view of the present invention.

FIG. 3 is a sectional view of the present invention. In the illustrated embodiment of the hydrogen generator 10 there is a generating tank or container 12 with a housing 48 defining a tank 56 filled with water 48 from any source. A container cover 22 is held tightly in place with clamps 24 to the housing 20. Inside the container 12 is a moveable inner tray 34 that holds the reactant aluminum pack 36 comprising aluminum 38 and hydride 40 within a membrane 42. A snap-on cap 72 made of breathable membrane 42 and a silicone edge is also available. A motor 44 in the cover 22 of said container 12 is connected to a screw rod 46 in the center of the container 12 and inner tray 34. When the container 12 is filled with water 48 and electrical power is applied to the motor 44 the motor gear 50 will turn, thereby turning the connected screw rod 46 inside the inner tray's 34 threaded bore 52 causing said inner tray 34 to move down into the water 48.

The container 12 is covered and sealed tightly with the cover 22 secured by the clamps 24. Motor 44 derives its power from a NiMH battery depicted in FIG. 6. A hose 30 is connected to the container 12 at the cover 22 and has one end connected to a vehicle's fuel line.

Figure 4:
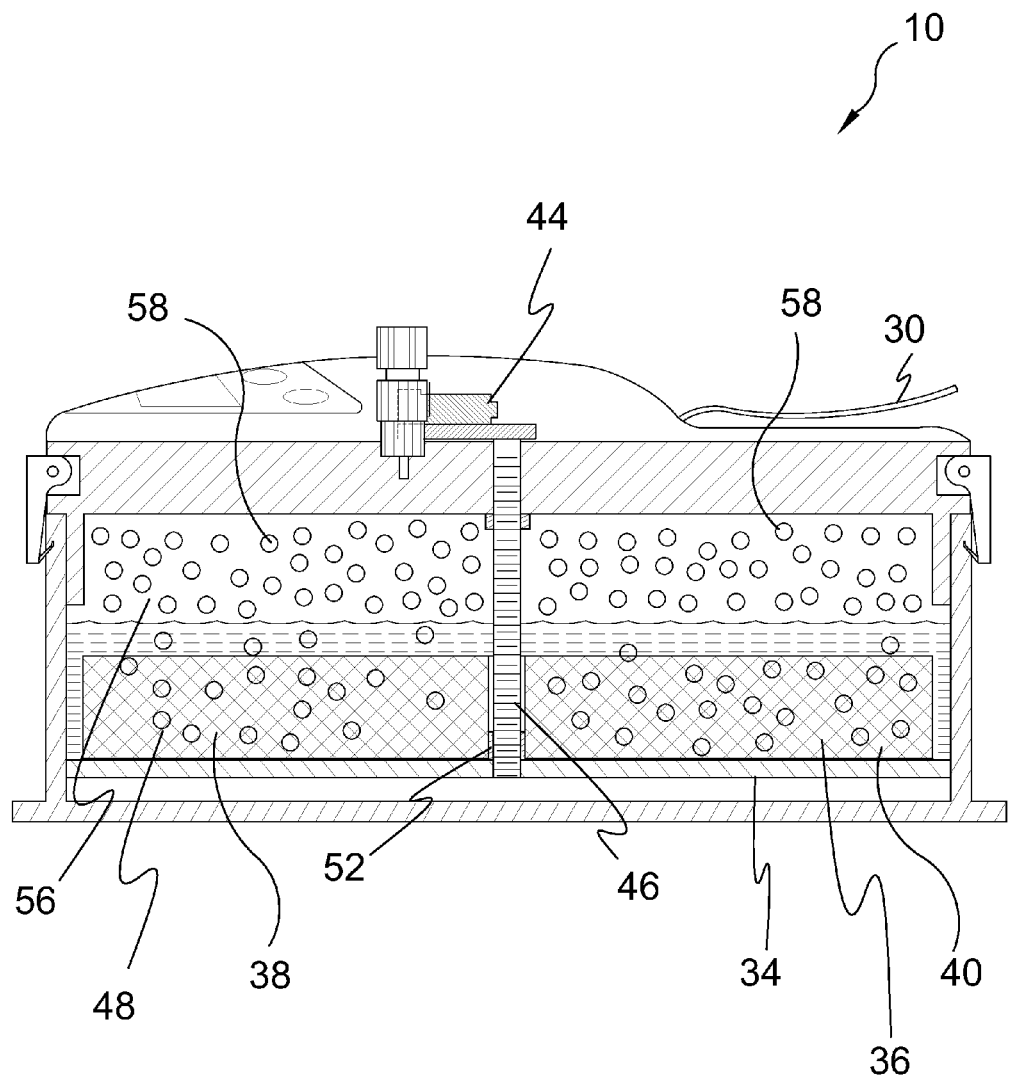
FIG. 4 is a sectional view of the present invention.

FIG. 4 is a sectional view of the hydrogen generator 10 of the present invention. When the vehicle is started, power from the 12 volt battery will cause the motor 44 to turn the screw rod 46 within the threaded bore 52 causing the inner tray 34 to be lowered into the water 48 in the tank 56. The hydride 40 in the aluminum pack 36 will be activated in water 48 and cause the aluminum surface 38 to be exposed thereto. At this point the protective oxide film which naturally forms on exposed aluminum surfaces 38 is disrupted, and the exposed aluminum surfaces 38 reacts with the water 48. As a result, hydrogen bubbles 58 are released from the contact point while aluminum 38 is consumed and turned into white alumina power. The hose 30 will send the hydrogen gas 58 to the vehicle's gas line. No electrical power source was needed to produce hydrogen 58.

Figure 5:
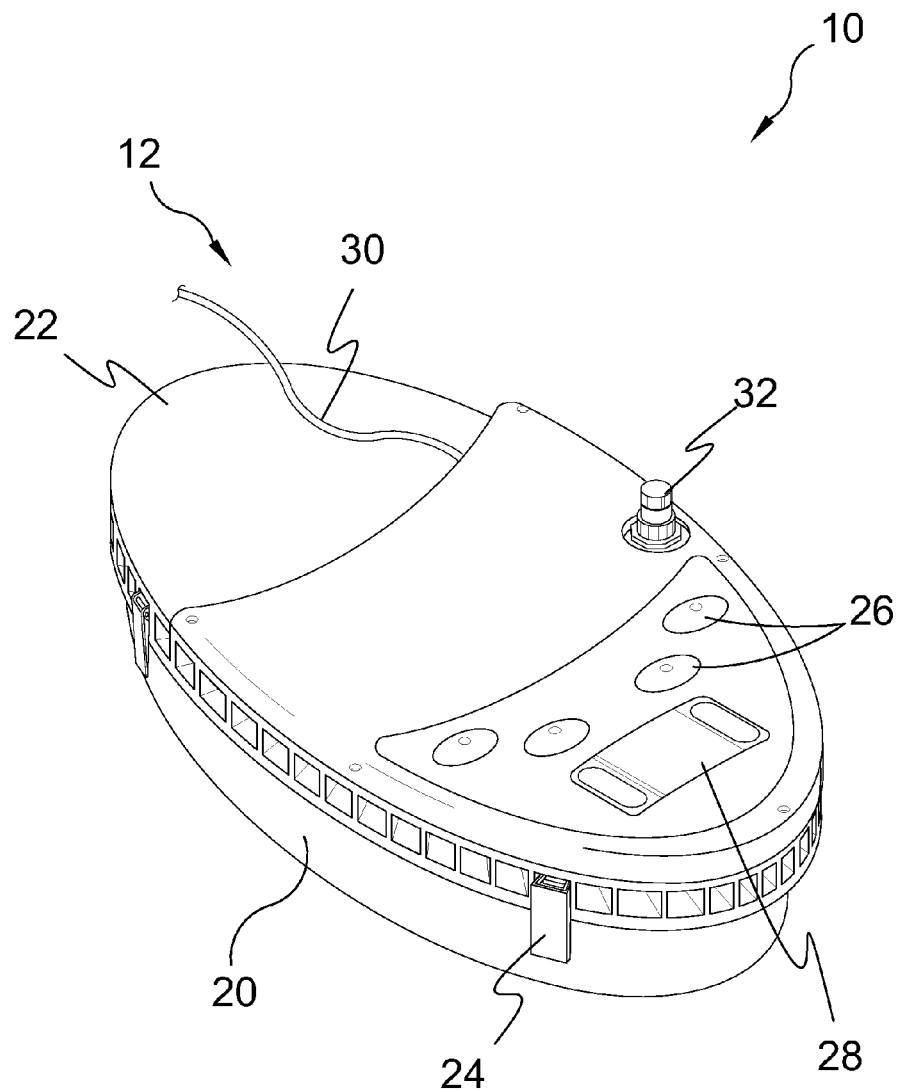
FIG. 5 is a perspective view of the present invention.

FIG. 5 is a perspective view of the present invention. Shown is the container 12 of the hydrogen generator 10 with the cover 22 hermetically sealed to the housing 20 with the clamps 24. Also shown on the cover 22 are the manual control buttons 26, digital display 28, safety relief valve 32 and the hydrogen delivery hose 30.

Figure 6:
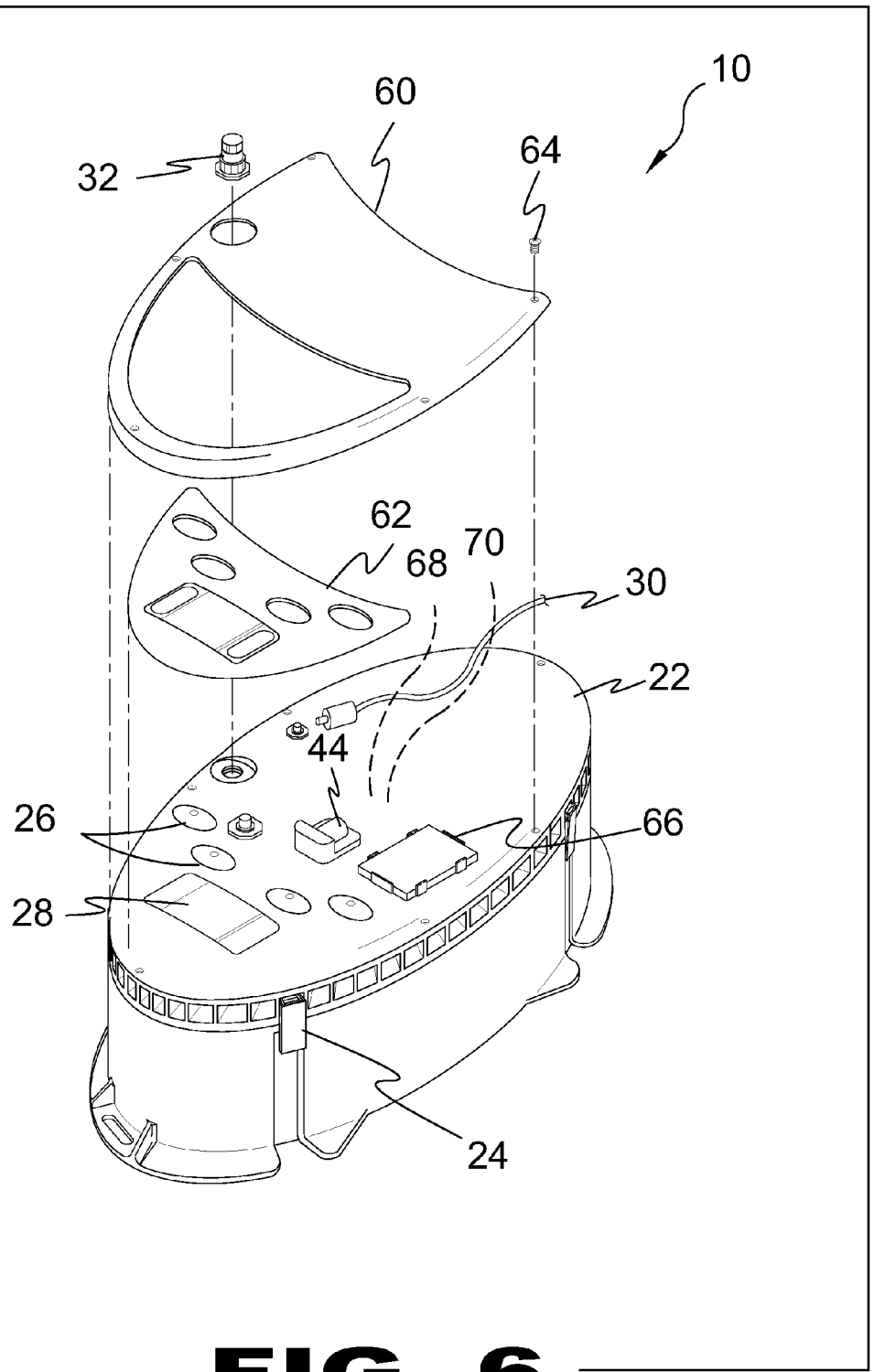
FIG. 6 is an exploded perspective view of the present invention.

FIG. 6 is an exploded perspective view of the hydrogen generator of the present invention. Shown is the cover 22 secured to the housing 20 with the clamps 24 and the LCD display cover 60 removed thereby exposing the digital display 28, manual control buttons 26 and battery 66. Also illustrated are the safety relief valve 32, hose 30 and fastener element 64 for retaining the LCD display cover 60 to the cover 22. A pressure transducer 68 will be in the cover 22 and will be connected to a single microprocessor chip 70 to control the pressure in the container 12. When the pressure is under a certain range, the single chip 70 will make the tray go down into the water, when the pressure is beyond a prespecified range, the single chip 70 will reverse the motor to extract the tray out of the water.

Figure 7:
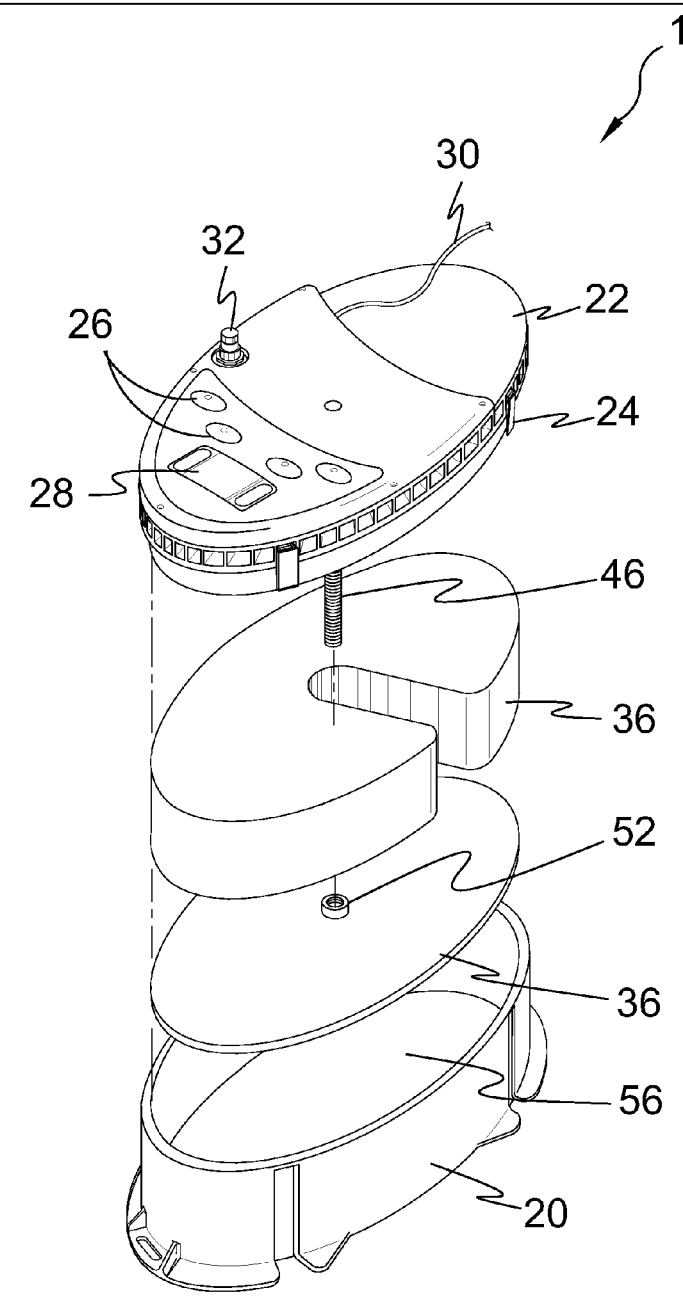
FIG. 7 is an exploded perspective view of the present invention.

FIG. 7 is an exploded perspective view of the hydrogen generator 10 of the present invention. Depicted is the cover 22 with hydrogen delivery hose 30, safety relief valve 32, manual control buttons 26, digital display 28 and clamps 24. Also shown is the screw rod 46, reactant aluminum pack 36, inner tray 34 with threaded bore 52, tank 56 and housing 20.

Figure 8:
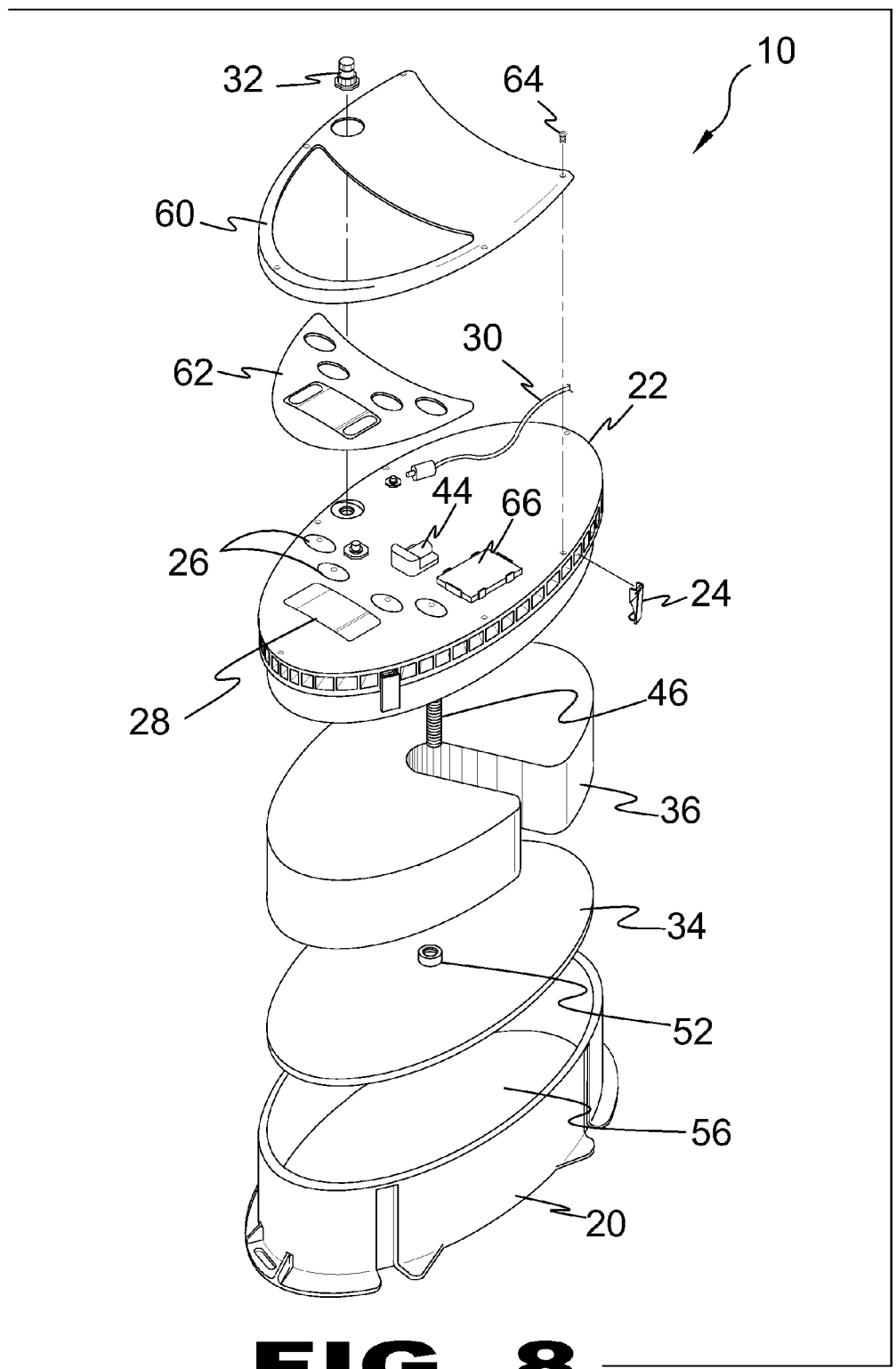
FIG. 8 is an exploded perspective view of the present invention.

FIG. 8 is an exploded perspective view of the hydrogen generator 10 of the present invention. Depicted is the cover 22 with LCD display cover 60 and LCD display plate cover 62 and mounting fastener element 64 removed and the hydrogen delivery hose 30, safety relief valve 32, manual control buttons 26, digital display 28 and clamps 24. Also shown is the screw rod 46, reactant aluminum pack 36, inner tray 34 with threaded bore 52, tank 56 and housing 20.

Figure 9:
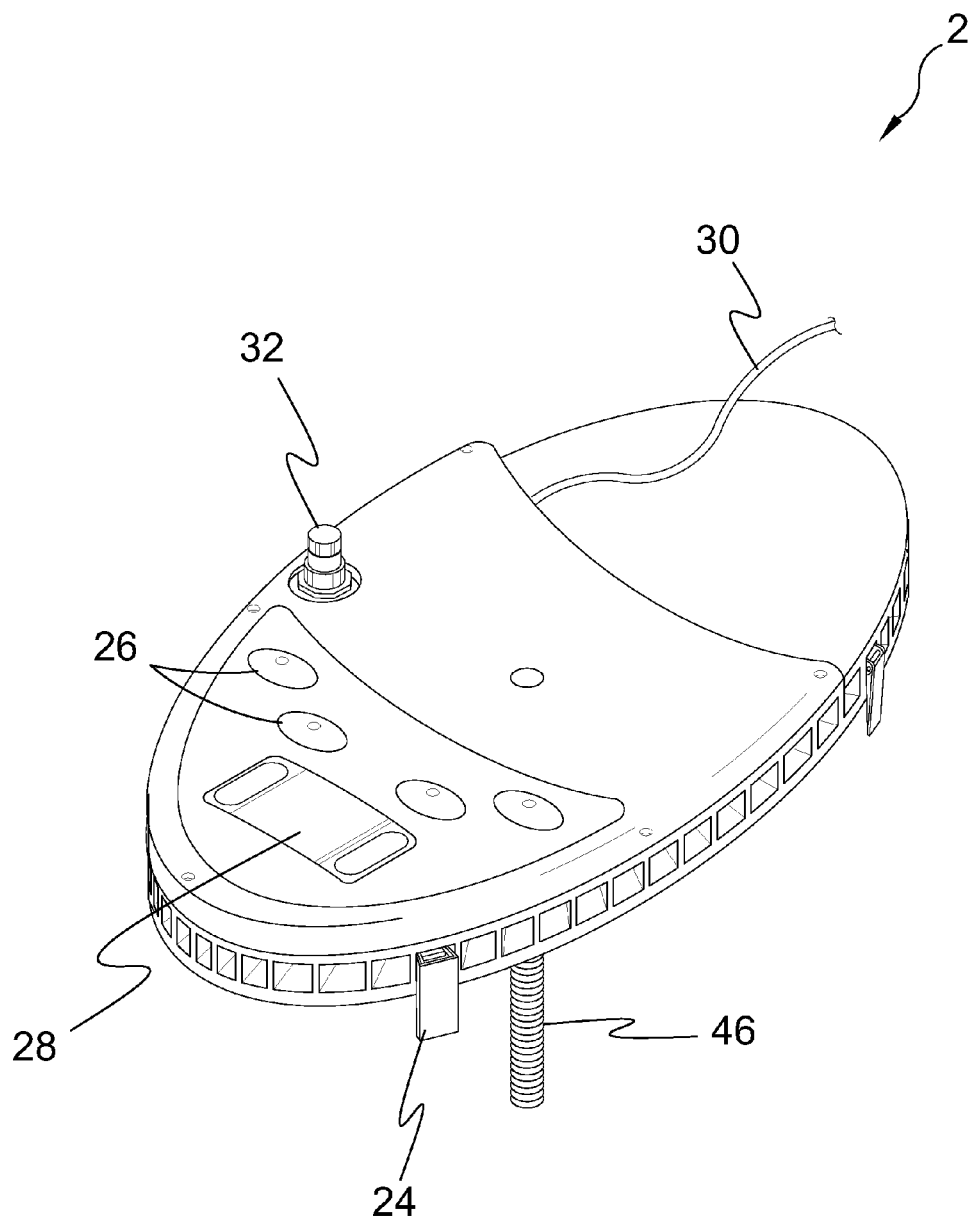
FIG. 9 is a perspective view of the cover of the present invention.

FIG. 9 is a perspective view of the cover 22 of the present invention. Shown are the hydrogen delivery hose 30, safety relief valve 32 manual control buttons 26, digital display 28, clamps 24 and the screw rod 46.

Figure 10:
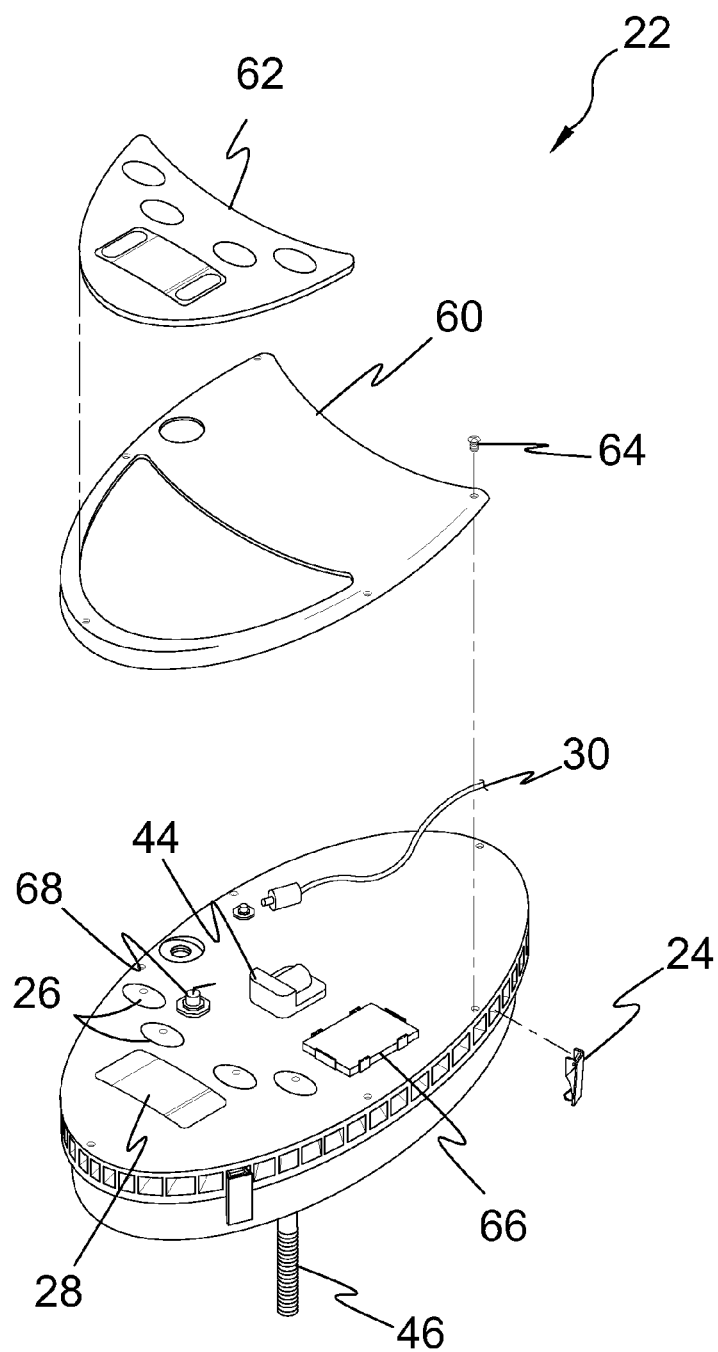
FIG. 10 is an exploded perspective view of the cover of the present invention.

FIG. 10 is an exploded perspective view of the cover 22 of the present invention. Depicted is the cover 22 with LCD display cover 60 and LCD display plate cover 62 and mounting fastener element 64 removed therefrom due to releasing the clamps 24. Also shown are the motor 44, hydrogen delivery hose 30, safety relief valve 32 manual control buttons 26, battery 66, digital display 28, clamps 24, internal emergency back-up battery 66 and screw rod 46.

Figure 11:
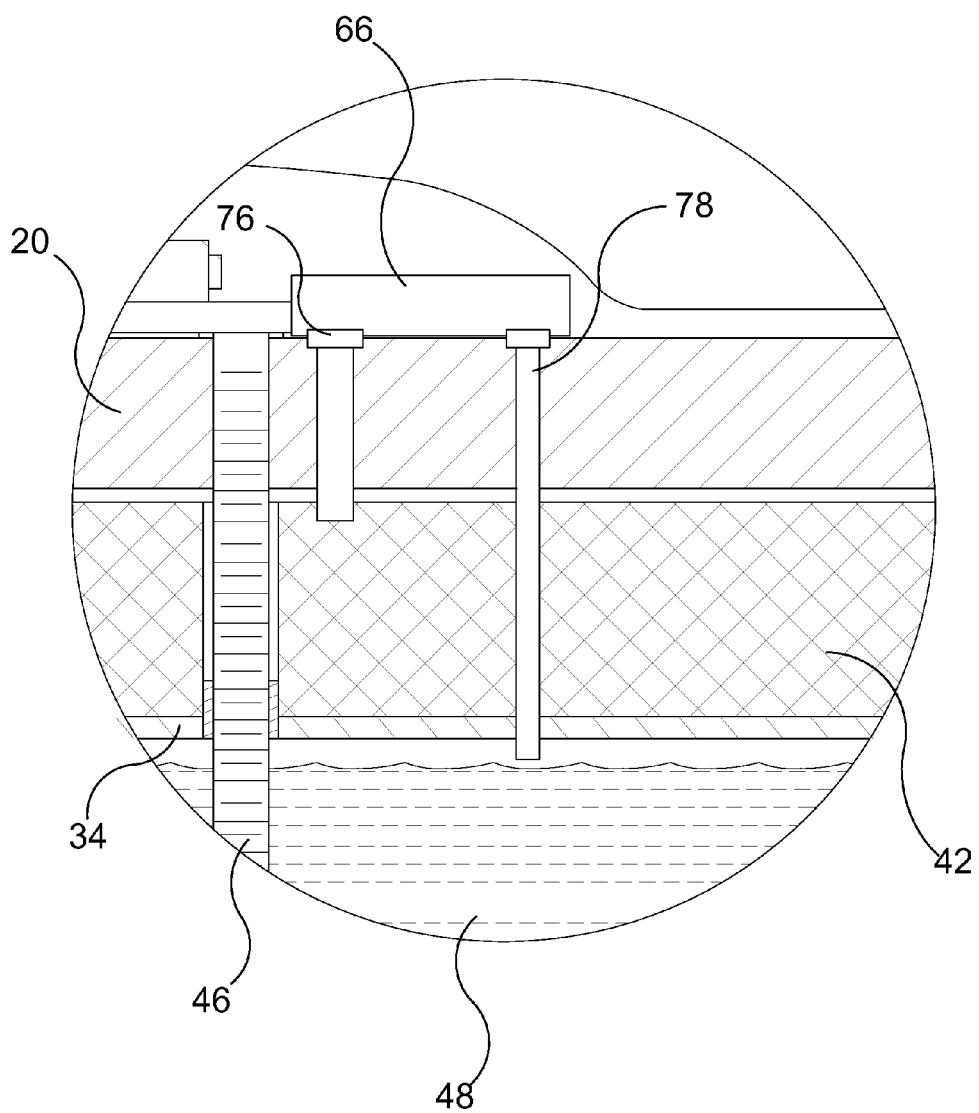
FIG. 11 is a detailed sectional view of the battery of the present invention.

FIG. 11 is a detailed sectional view of the battery 66, of the present invention depicting a hydrogen inlet valve 76, for chemically charging and replenishing the battery 66, and a water outlet valve 78, for releasing its byproducts back into the water 48, reservoir of the device.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various application without omitting features that, from the standpoint of the prior art, fairly constitute essential characteristics of the generic or specific aspects of this invention.

What is claimed is new and desired to be protected by Letters Patent is set forth in the appended claims:

1. A hydrogen generator comprising:
    a) a housing defining an interior tank;
    b) a cover for said housing;
    c) an aluminum pack comprising aluminum and hydride within a membrane;
    d) a fluid disposed within said tank; and
    e) means for selectively lowering and raising said aluminum pack into said fluid to regulate the production of hydrogen molecules.

2. The hydrogen generator according to claim 1, wherein exposure to said fluid acts as a catalyst for a chemical reaction releasing hydrogen molecules from said aluminum pack due to the disruption of the protective oxide film naturally formed on the surface of said aluminum and the fluid contacting said aluminum surface.

3. The hydrogen generator according to claim 1, wherein said means for raising and lowering said aluminum pack comprises:
    a) a reversible motor disposed in said cover;
    b) a threaded rod mechanically communicating with said motor; and
    c) an inner tray with a threaded bore through which said threaded rod is inserted therein, said aluminum pack being placed on said inner tray.

4. The hydrogen generator according to claim 3, wherein said reversible motor derives its power from a nickel metal hydride battery.

5. The hydrogen generator according to claim 3, wherein said housing and said inner tray have an ovate configuration.

6. The hydrogen generator according to claim 3, wherein said aluminum pack has a central groove to accommodate said threaded rod when placed on said inner tray.

7. The hydrogen generator according to claim 1, further comprising means for monitoring and regulating the hydrogen output thereof.

8. The hydrogen generator according to claim 7, wherein said means for monitoring and regulating the hydrogen output comprises:
    a) a pressure transducer for monitoring the pressure incurred by the production of hydrogen molecules within said tank; and
    b) a microprocessor chip in communication with said pressure transducer which raises said inner tray and said aluminum pack from said fluid when the pressure approaches a pre determined high limit and lowers it accordingly to maintain hydrogen production within a predetermined range thereby making the unit self regulating.

9. The hydrogen generator according to claim 7, wherein said nickel metal hydride battery has a hydrogen inlet valve for chemically charging and replenishing the battery.

10. The hydrogen generator according to claim 8, wherein said cover further comprises manual control buttons and a digital display to enable the user to manually set the rate of hydrogen production within a predetermined range.

11. The hydrogen generator according to claim 10, wherein said manual control buttons and digital display provide means for reading and understanding the contents of the hydrogen generator.

12. The hydrogen generator according to claim 10, wherein said manual control buttons and digital display provide means for reading the water level without having to open said hydrogen generator.

13. The hydrogen generator according to claim 10, wherein said manual control buttons and digital display provide means for monitoring the hydrogen generator by way of a wireless communication device.

14. The hydrogen generator according to claim 1, wherein said cover is hermetically secured to said housing with a plurality of clamps.

15. The hydrogen generator according to claim 1, wherein said cover further comprises a safety relief valve to release pressure within said tank in the event it approaches preset high limits.

16. The hydrogen generator according to claim 1, wherein said cover includes a hydrogen delivery hose for distributing hydrogen gas to the application.

17. The hydrogen generator according to claim 1, wherein said cover further comprises a nickel metal hydride battery to provide additional safety if power to the motor is unavailable during a high pressure situation.

18. The hydrogen generator according to claim 1, wherein said aluminum pack further comprises a snap on cover comprising a breathable membrane and a silicone edge.

19. The hydrogen generator according to claim 1, wherein said aluminum pack is replaceable once said aluminum is depleted and only a white alumina powder remains.

* * * * *